United States Patent
Wirtz et al.

(10) Patent No.: US 6,507,660 B1
(45) Date of Patent: Jan. 14, 2003

(54) METHOD FOR ENHANCING AIR-TO-GROUND TARGET DETECTION, ACQUISITION AND TERMINAL GUIDANCE AND AN IMAGE CORRELATION SYSTEM

(75) Inventors: Michael M. Wirtz, Ridgecrest, CA (US); William R. Ditzler, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/332,260

(22) Filed: May 27, 1999

(51) Int. Cl.$^7$ ................................................. G06K 9/00
(52) U.S. Cl. ....................................................... 382/103
(58) Field of Search .................................. 382/103, 106, 382/154, 190, 194, 195, 199, 209, 217, 218, 232, 256, 266, 285, 298; 356/3, 3.01, 3.02, 3.07, 3.06, 3.1, 3.14, 3.15, 3.16, 4.01, 4.13, 139.04; 348/137, 139, 140; 250/203.1, 203.6; 342/89, 409

(56) References Cited

U.S. PATENT DOCUMENTS

| | | | | |
|---|---|---|---|---|
| 3,609,762 A | * | 9/1971 | Diamantides | 342/108 |
| 5,424,742 A | * | 6/1995 | Long et al. | 342/25 |
| 5,432,712 A | * | 7/1995 | Chan | 382/191 |
| 5,887,083 A | * | 3/1999 | Sumi et al. | 382/199 |
| 5,905,807 A | * | 5/1999 | Kado et al. | 382/118 |
| 5,943,164 A | * | 8/1999 | Rao | 359/462 |
| 6,173,066 B1 | * | 1/2001 | Peurach et al. | 382/103 |
| 6,229,550 B1 | * | 5/2001 | Gloudemans et al. | 345/641 |
| 6,259,803 B1 | * | 7/2001 | Wirtz et al. | 382/103 |

* cited by examiner

Primary Examiner—Andrew W. Johns
Assistant Examiner—Shervin Nakhjavan
(74) Attorney, Agent, or Firm—Gregory M. Bokar; Laura R. Foster

(57) ABSTRACT

A method for enhancing air to ground target detection, acquisition and terminal guidance which includes providing a reference image of a target scene, detecting contrast boundaries, tracing edges along the edge pixels, storing in computer memory endpoints of fitted straight line segments, providing a video image of the target scene, identifying contrast boundaries, scaling and transforming the template, correlating it with the edges of the video image, and converting the target designation in the reference image to the sensor image. A multispectral gradient based image correlation system including a template containing information as to edges, a video image of a target processed by a gradient operator, means for correlating the template and the image edge-to-edge, a means for transferring the target from the template to the image, that provides an enhanced video image with the target within it.

4 Claims, 3 Drawing Sheets

METHOD FOR ENHANCING AIR-TO-GROUND TARGET DETECTION, ACQUISITION AND TERMINAL GUIDANCE AND AN IMAGE CORRELATION SYSTEM

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

CROSS-REFERENCE TO RELATED APPLICATION

Not Applicable.

BACKGROUND OF THE INVENTION

1. Field of the Invention

The invention relates to methods and devices for air-to-ground target detection, acquisition and terminal guidance, and is directed more particularly to methods and devices for correlating selected prepared imagery with imagery produced by an airborne platform-mounted sensor, to obtain improved guidance of air-launched weapons to a selected target designated on the prepared imagery.

2. Description of the Prior Art

It is known to use multispectral image correlation systems in air-to-ground target detection and acquisition. Such systems include means for image-processing, which automatically register images produced by airborne platform-mounted sensors operating in different wavelengths and from different points of view.

There is a need for an improved, more accurate guidance system which can be used in conjunction with airborne platform-mounted sensors and additionally, for precision terminal guidance of weapons with imaging sensors thereon.

SUMMARY OF THE INVENTION

An object of the invention is, therefore, to provide a method for providing improved accuracy in guidance systems for air-launched weapons, such as air-to-ground missiles.

A further object of the invention is to provide a multispectral gradient based image correlation system for use in carrying out the above method.

A still further object of the invention is to provide such an image correlation system suitable for other uses wherein a current real-time image is compared with a recorded image.

With the above and other objects in view, as will herewith appear, a feature of the present invention is the provision of a method for enhancing air-to-ground target detection, acquisition, and terminal guidance, the method comprising the steps of:

(1) providing a reference image of a target scene with a designated selected target therein, (2) detecting contrast boundaries and orientation thereof in the reference image, (3) identifying maxima edge pixels in the reference image determined by contrast boundaries, and tracing edges along the maxima edge pixels, (4) converting points in the reference image to points in three-dimensional space, and compressing the reference image by fitting straight line segments to the reference image edges, and storing in a computer memory only end points of the straight line segments, which constitute a reference image template, (5) providing a video image of the target scene from a sensor mounted on an airborne platform, (6) identifying contrast boundary edges of the video image;

(7) transforming and scaling the template to a line-of-sight, range, and field-of-view of the sensor, (8) correlating the edges of the video image with the transformed and scaled template made from the edges of the reference image, and (9) converting the selected target designation in the reference image to the sensor image.

In accordance with a further feature of the invention, there is provided a multispectral gradient based image correlation system comprising a template containing information as to edges in imagery of a target scene, and a selected target therein, a video image of the target scene produced by sensor imagery and processed by a gradient operator into a gradient based edge image, means for transforming, scaling and correlating the template image with the gradient based edge image, and means for transferring the selected target from the template to the gradient based edge image, whereby to place the selected target in the video image which is correlated edge-to-edge with the template target scene imagery.

In accordance with a still further feature of the invention, there is provided a multispectral gradient based image correlation system comprising a template containing information as to edges in recorded and stored imagery depicting a reference item, a video image processed by a gradient operator into a gradient based edge image, and a means for correlating the template imagery with the gradient based edge image.

The above and other features of the invention, including various novel details of method steps, arrangements, and combinations of parts, will now be more particularly described with reference to the accompanying drawings and pointed out in the claims. It will be understood that the particular method steps and devices embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent, and wherein.

DESCRIPTION OF THE PREFERRED EMBODIMENTS

Figure 1:
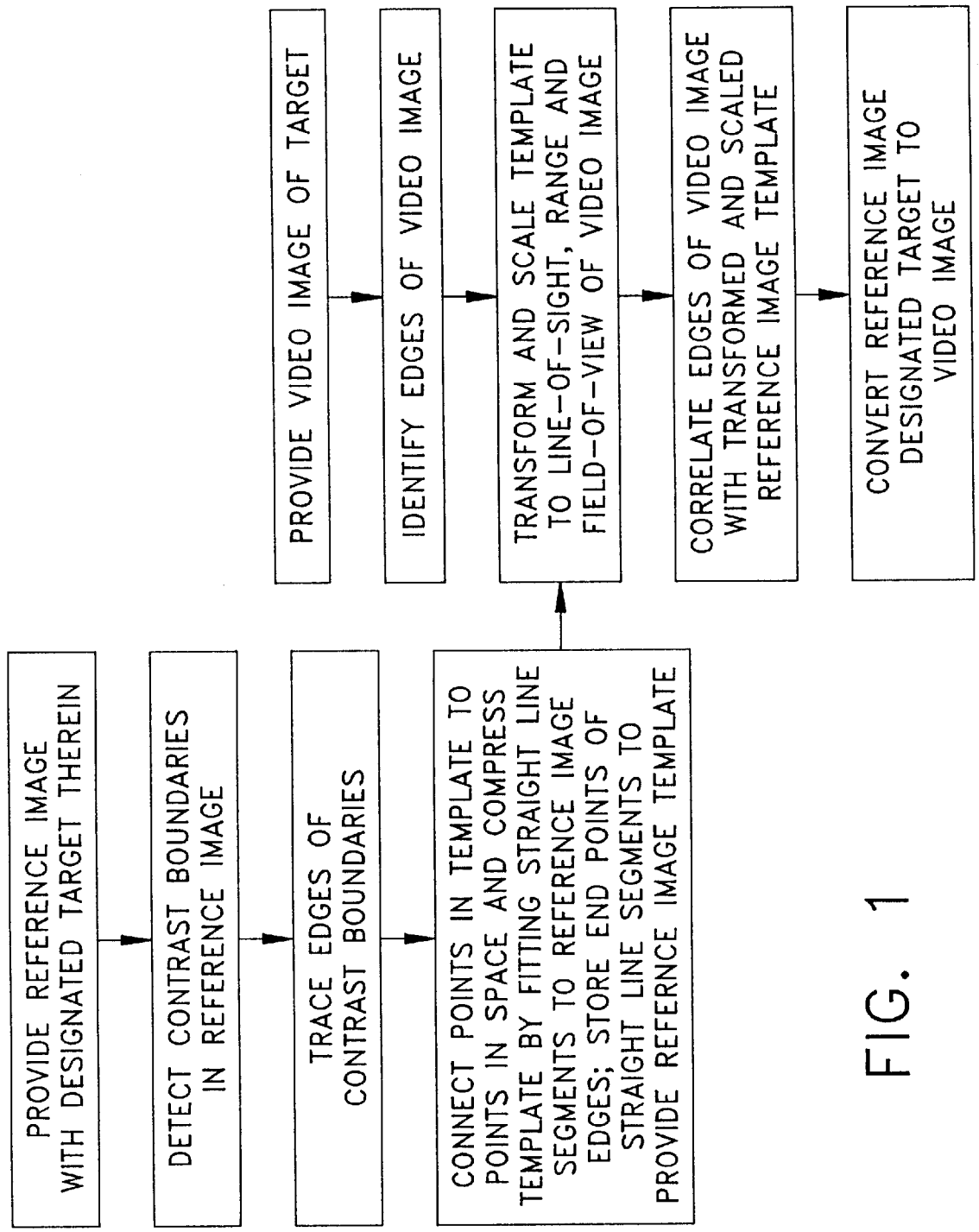
FIG. 1 is a flow chart depicting one form of a method illustrative of an embodiment of the invention.

In accordance with a preferred embodiment of the invention, there is provided a digitized reference image of a target scene with a selected target designated therein. The reference image is produced in advance of a mission directed toward a real target corresponding to the target designated in the reference image.

A spatial gradient operation detects contrast boundaries in the reference image, and their orientation, with a set of convolution kernels. A Sobel operator is a preferred means for effecting the gradient operation.

Maxima edge pixels in the reference image are determined by contrast boundaries and identified. Edges along the maxima edge pixels are traced.

To compress the edge data, straight line segments are fitted to the reference image edges where possible, and endpoints of the straight line segments are stored in a computer memory. If three-dimensional information of the reference scene is available, such as a terrain elevation database, it is used to connect the end points to points in three-dimension space. Otherwise, the points are assigned a third dimension (of zero) by assuming they are on a flat horizontal surface. All of the data relative to shapes of target edges is contained in a list of segment endpoints constituting a reference image template.

A video image of the target scene is provided by a sensor mounted on an airborne platform, such as an aircraft, a missile, or other vehicle or weapon.

Contrast boundary edges of the video image are identified by application of a spatial gradient operator to the video image. The magnitude of video image edge strength is thereby determined.

Based upon the estimated position of the airborne platform relative to the target scene, and the pointing direction of the sensor from the axis of the platform, the endpoints in the template are converted to positions in the image plane of the sensor, and transformed and scaled to the sensor line-of-sight, range, and field-of-view.

The edges of the video image are then correlated with the transformed and scaled template. A two-dimensional spatial correlation function is performed between a sensor gradient array and a template array. The most efficient procedure for this step is conversion of both arrays to a spatial-frequency domain with fast Fourier transforms, multiplication of the fast Fourier transform arrays, with conjugations of one array and inverse transformation of the product thereof.

Finally, the selected target designation in the reference image is converted to the sensor image to provide an enhanced sensor image with the selected target therein. Analysis of the correlation-surface array resulting from the above-described correlation searches for a well-defined peak from which the target designation, or aimpoint, position with regard to the template can be converted to a position in the sensor image.

Accuracy relative to conversion of the designated target in the reference image to the sensor image can be improved by including the additional steps of obtaining successive frames of sensor imagery and repeating the above steps.

The only required operator input in the above-described method in the template generation process is the identification of the desired target, or aimpoint, in the reference image. This function can be performed by aircrew members with no training in image analysis and without significantly increasing the workload in usual mission-planning procedures.

The compact structure of the template enables its transmission over low-bandwidth datalinks for "real-time retargeting" of mobile and other time-critical targets. It also permits the perspective transformation operations to be performed at video frame rates. The simple processing applied to the sensor video permits the entire correlation process to operate at full video frame rates with inexpensive signal processors.

Of particular advantage is the fact that the conversion of edges of the reference image to a list of line sequence endpoints in three-dimensional space, i.e., production of the template, is fully automated. Of further advantage is the fact that the perspective transformed template is correlated directly to the spatial gradient of the sensor image.

The correlation above described does not make use of information relative to the direction of the edges of the two images. The spatial gradient is a vector with a well defined direction in the image plane. The correlation process is made more robust when edges in different directions are not allowed to correlate. However, it is necessary to correlate images from different wavelengths and sensor technologies, so the correlation process must be immune to contrast reversals. The gradient vectors of a dark-to-light edge and a parallel light-to-dark edge point in 180 degree opposite directions. Accordingly, it is not acceptable to take the dot product of the gradient vectors inasmuch as contrast reversed edges would anti-correlate.

Figure 2:
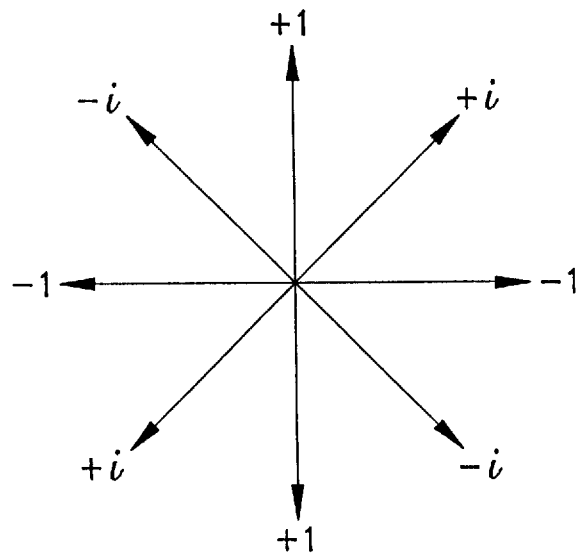
FIG. 2 is a schematic representation of an optional feature which may be incorporated into the illustrative embodiment of FIG. 1.

A solution is to convert the gradient vector to a complex number of the form (edge strength) exp (2i theta), where theta is the angle of the vector with the y-axis of the image plane. In FIG. 2 there is shown the resulting complex values for a unit vector at 45 degree rotation steps. It will be seen that perpendicular vectors anti-correlate and parallel vectors correlate positively, even if they are in opposite directions. Thus, edges which are not shared between the two images will, on average, have as many parallel overlaps as perpendicular overlaps, if they are randomly distributed in direction, similar to many types of natural terrain features. The net contributions of such edges to the correlation score is zero.

Thus, in correlating the edges of the video image with the transformed and scaled template made from the edges of the reference image, substantially coincident edges exhibiting a difference in contrast are correlated, and there is provided an enhanced correlation wherein both edge magnitude and direction are input for correlation.

Figure 3:
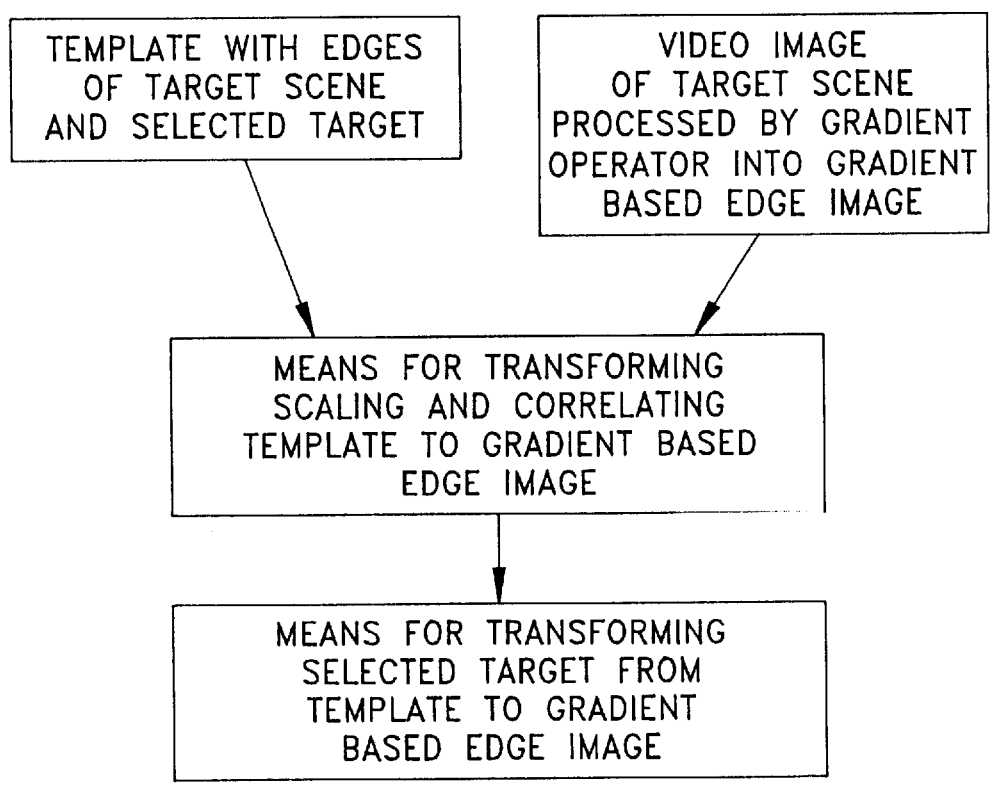
FIGS. 3 and 4 are diagrammatic representations of systems illustrative of alternative embodiments of the invention.

Referring to FIG. 3, it will be seen that a system for carrying out the above-described method includes the template image with edges of the target scene and the selected target. This imagery is recorded and stored prior to a mission directed at the selected target. The system further includes a video image of the target scene, obtained during the mission, which video scene is processed by a gradient operator. The system still further includes means for transforming, scaling and correlating the template image to the gradient based edge image. Finally, the system includes means for transferring to the gradient based edge image the selected target from the template image to the gradient based edge image to provide an enhanced edge image with the selected target therein.

Figure 4:
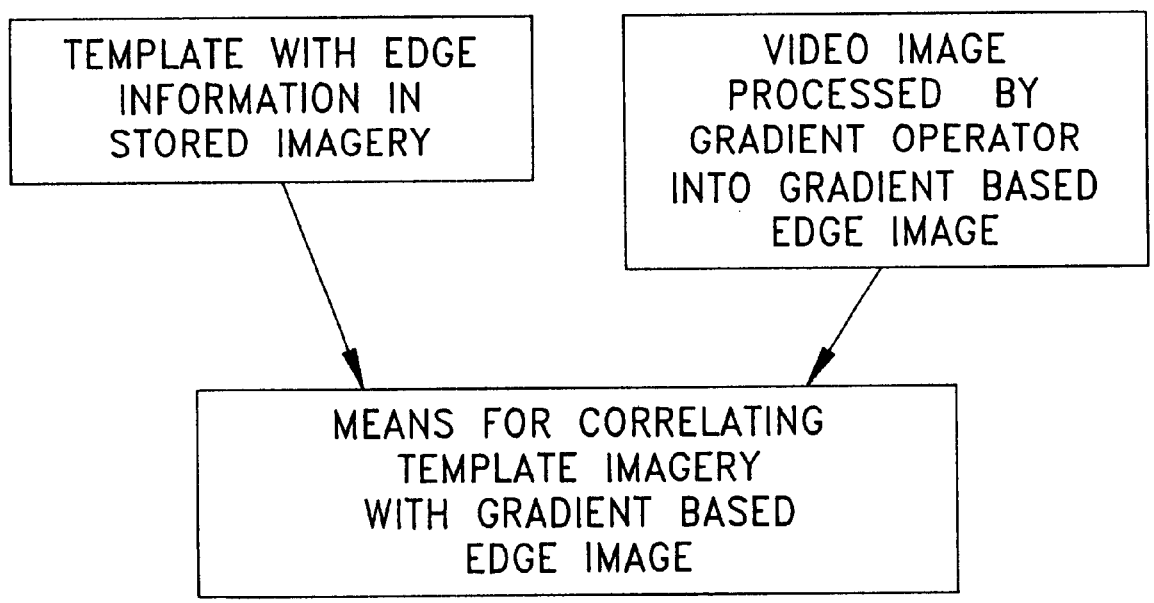

Referring to FIG. 4, it will be seen that an alternative system comprises a template with edge information in stored imagery, a video image processed by a gradient operator into a gradient based edge image, and means for correlating the template imagery with the gradient based edge image. This system finds utility in security arrangements, wherein, for example, the video image is a thumb print offered by a person seeking entry into a restricted area, and the template is stored information relative to thumb prints of persons cleared for entry, and the means for correlating the actual thumb print with the stored image comprises a computer.

It is to be understood that many changes in the details, and arrangement of method steps and parts, which have been herein described and illustrated in order to explain the nature of the invention, may be made by those skilled in the art within the principles and scope of the invention as expressed in the appended claims.

What is claimed is:

1. A method for enhancing air-to-ground target detection, acquisition, and terminal guidance, the method comprising the steps of:

(1) providing a reference image of a target scene with a designated selected target therein;

(2) detecting contrast boundaries and orientation thereof in the reference image;

(3) identifying maxima edge pixels in the reference image determined by contrast boundaries, and tracing edges along the maxima edge pixels;

(4) converting points in the reference image to points in three-dimensional space, and compressing the reference image by fitting straight line segments to the reference image edges, and storing in a computer memory only end points of the straight line segments, which constitute a reference image template;

(5) providing a video image of the target scene from a sensor mounted on an airborne platform;

(6) identifying contrast boundary edges of the video image;

(7) transforming and scaling the template to a line-of-sight, range, and field-of-view of the sensor;

(8) correlating the edges of the video image with the transformed and scaled template made from the edges of the reference image; and (9) converting the selected target designation in the reference image to the sensor image, to provide an enhanced sensor image with the selected target therein.

2. The method in accordance with claim 1 and comprising an additional step of obtaining successive frames of sensor imagery and repeating steps (5)–(9) to increase accuracy of placement of the selected target designated in the reference image in the sensor image.

3. The method in accordance with claim 1 wherein in correlating the edges of the video image with the transformed and scaled template made from the edges of the reference image, substantially coincident edges exhibiting a difference in contrast are correlated.

4. The method in accordance with claim 1 wherein a spatial gradient operation is effected to produce the edge images for making the template and for the sensor image, providing edge magnitude and gradient vectors to compute edge direction, and including the step of correlating the edges of the video image with the transformed and scaled template made from the edges of the reference image, to provide an enhanced correlation wherein both edge magnitude and edge direction are input for the correlation.

* * * * *